United States Patent
Czaja et al.

(10) Patent No.: US 6,424,631 B1
(45) Date of Patent: Jul. 23, 2002

(54) APPARATUS AND METHODS FOR DETERMINING RATE OF TRANSMITTED VARIABLE RATE DATA

(75) Inventors: Stash F. Czaja, Cardiff; Kraig L. Anderson, San Diego, both of CA (US)

(73) Assignee: Infineon Technologies North America Corp., San Jose, CA (US)

( * ) Notice: Subject to any disclaimer, the term of this patent is extended or adjusted under 35 U.S.C. 154(b) by 0 days.

(21) Appl. No.: 09/097,255

(22) Filed: Jun. 11, 1998

(51) Int. Cl.[7] .............................................. H04L 12/26
(52) U.S. Cl. ........................ 370/252; 375/147; 375/340
(58) Field of Search ................................ 375/130, 141, 375/147, 317, 320, 340, 344, 345, 346; 370/252, 465, 468, 545, 335, 342, 479

(56) References Cited

U.S. PATENT DOCUMENTS

| | | | |
|---|---|---|---|
| 5,509,020 A | | 4/1996 | Iwakiri et al. |
| 5,533,014 A | | 7/1996 | Willars et al. |
| 5,566,206 A | | 10/1996 | Butler et al. |
| 5,627,845 A | * | 5/1997 | Asano et al. ................ 714/795 |
| 5,682,416 A | | 10/1997 | Schmidt et al. |
| 5,689,511 A | * | 11/1997 | Shimazaki et al. .......... 370/545 |
| 5,790,592 A | * | 8/1998 | Baik ........................... 375/219 |
| 5,796,757 A | | 8/1998 | Czaja |
| 5,872,775 A | * | 2/1999 | Saints et al. ................. 370/342 |
| 6,094,428 A | * | 7/2000 | Bruckert et al. ............. 370/335 |
| 6,097,716 A | * | 8/2000 | Abrishamkar ................ 370/342 |
| 6,111,912 A | * | 8/2000 | Cohen et al. ................ 375/225 |

FOREIGN PATENT DOCUMENTS

EP 0763902 A1 3/1997

* cited by examiner

Primary Examiner—Chau Nguyen
Assistant Examiner—D. Trinh
(74) Attorney, Agent, or Firm—Fish & Richardson P.C.

(57) ABSTRACT

A rate determination unit and methods for use in a receiver in a communication system that is adapted to receive communications at a plurality of different data rates is disclosed. The rate determination unit is configured to receive an encoded signal and determine the encoded signal's data rate without first requiring decoding of the encoded signal. In a preferred embodiment, the rate determination unit includes a plurality of hypothesis units and a hypothesis analyzer. Each hypothesis unit is arranged to determine a hypothesis value for a frame of the encoded signal at an associated one of the data rates. The hypothesis analyzer is arranged to compare selected hypothesis values, determine the frame data rate based on such comparisons, and output a rate indication signal based on the determined frame data rate. Preferably, a first one of the hypothesis units is arranged to sum a first plurality of absolute values that are associated with discrete samples, and a second one of the hypothesis units is arranged to sum a second plurality of absolute values. Each of the second plurality of absolute values is a sum of a plurality of samples.

40 Claims, 8 Drawing Sheets

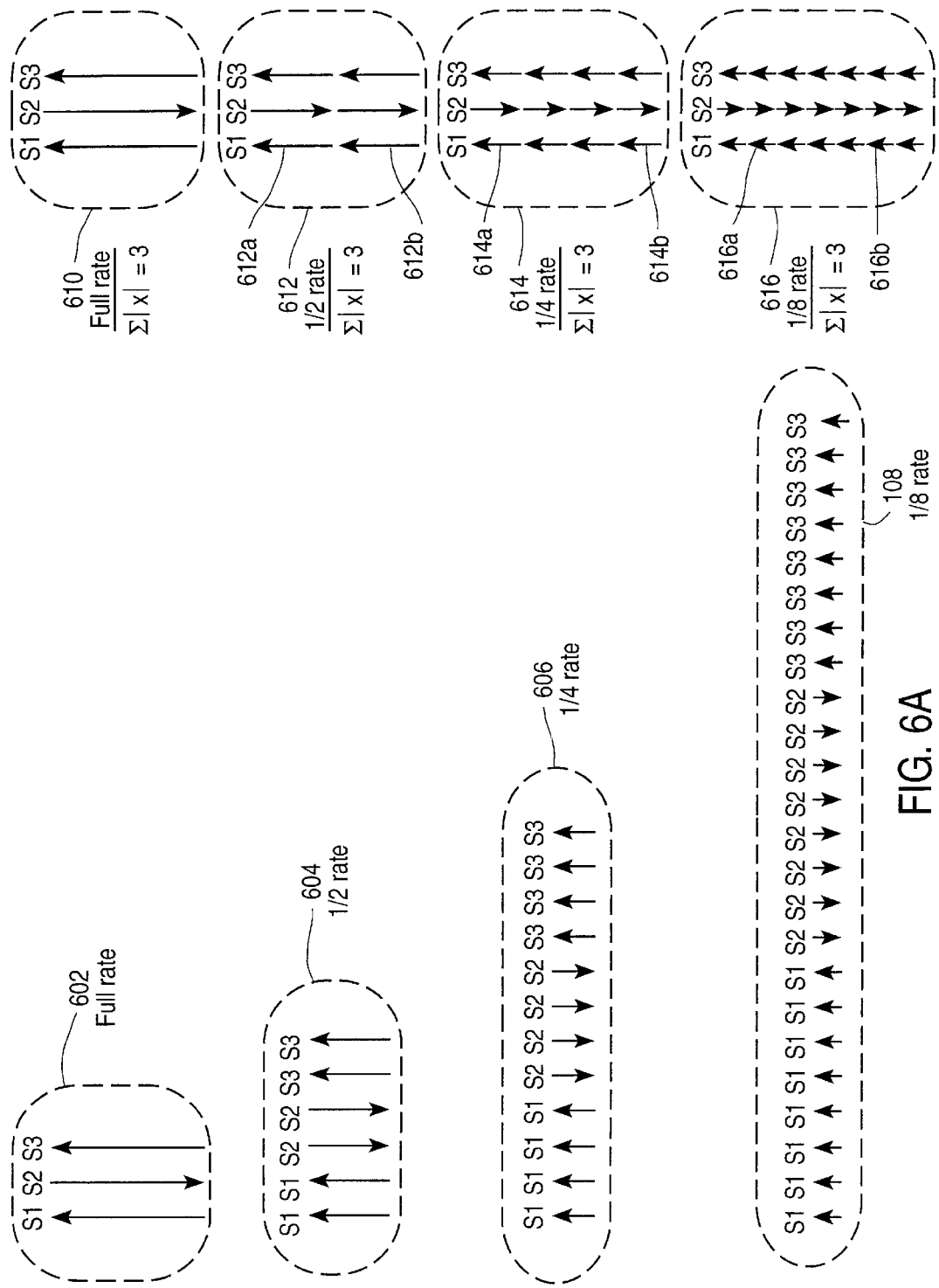

APPARATUS AND METHODS FOR DETERMINING RATE OF TRANSMITTED VARIABLE RATE DATA

BACKGROUND OF THE INVENTION

This invention relates generally to data communication systems that support multiple data transmission rates. More particularly, mechanisms for determining the data transmission rate are described.

Cellular communication systems have grown dramatically in popularity in recent years. To date, a variety of cellular networks have been implemented, and one of the increasingly popular types of network is referred to as a code division multiple access (CDMA) system. The radio interface for CDMA systems is defined by the Telecommunications Industry Association and Electronic Industries Association (TIA/EIA) Interim Standard IS-95. In CDMA, each user signal includes a different orthogonal code and a pseudo-random binary sequence that modulate a carrier, spreading the spectrum of the waveform, and thus allowing a large number of user signals to share the same frequency spectrum.

The user signals are separated in the receiver with a correlator (or de-spreader) which allows only the signal energy from the selected orthogonal code to be de-spread. The other users signals, whose codes do not match are not despread and, as such, contribute only to noise and thus represent a self-interference generated by the system. The SNR of the system is determined by the ratio of desired signal power to the sum of the power of all interfering signals, enhanced by the system processing gain or the spread bandwidth to the baseband data rate.

The CDMA system as defined in IS-95 uses a CELP-based variable rate voice coding (vocoder) algorithm in which the data rate changes dynamically on a frame by frame basis as a function of the speech pattern (voice activity). The Traffic Channel frames can be transmitted at full, ½, ¼ or ⅛ rate (for example, 9600, 4800, 2400 and 1200 bps, respectively, for Rate Set I). With each lower data rate, the transmitted symbol power ($E_s$) is lowered proportionally, thus enabling an increase in the number of user signals in the channel. Since the data rate is not known a priori to the receiver, a conventional Viterbi decoder performs sequential decoding of all possible rates and then determines the rate of the current data frame.

A 20 ms Traffic Channel Rate Set 1 frame thus contains 192, 96, 48 and 24 data bits for rates full, ½, ¼ and ⅛, respectively. Prior to convolution encoding, the data bits for full rate and half rate are encoded with a CRC polynomial and the 12 and 8 bit (respectively) CRC fields are appended to the data bits. However, the ¼ and the ⅛ rates are not protected by the CRC. Hence, for the two higher rates at least, rate determination may be performed by using the CRC.

However, if an error occurs in the associated CRC field, the received information is of little value in the rate determination process. Additionally, as specified in the IS-95 Interim Standard, the data rate Set 1 protects only the two highest data rates (9600 bps and 4800 bps) with the CRC polynomial. The two lower data rates (2400 bps and 1200 bps) are not protected by the CRC at all. As such, the rate determination must be performed using criteria other than the CRC.

There are two additional criteria which may be used in performing the rate determination: SER (Symbol Error Rate), and the size of the Viterbi-determined Cumulative Path Metric for the ML (Most Likely) path calculated during Viterbi decoding. However, in any practical system these two parameters are very unreliable, since the first parameter varies largely as a function of SNR (Signal-to-Noise Ratio), while the second parameter is typically distorted by a scaling of the ML path Cumulative Metrics during the decoding process.

In greater detail, in a wireless communications system such as IS-95, the traffic channel supports variable data rate operation at 9600, 4800, 2400, and 1200 bps for the Set 1 of rates, and 14400, 7200, 3600 and 1800 bps for the Set 2 of rates. In the variable rate system, the transmitter may change the rate from frame to frame depending on the overall channel conditions. Also, in a spread spectrum system, such as that specified by IS-95, the system maintains a constant channel rate of 19.2 kHz regardless of the actual data rate transmission. This is achieved by repeating the symbols by two, four or eight times (for the respective lower data rates).

After demodulation of the signal, the receiver must determine the data rate of the current frame before the frame is sent to a vocoder or a data file. This is conventionally done by the Viterbi decoder, which performs the consecutive decoding of all possible data rates and then determines the transmitted rate. In this process, the Viterbi decoder uses the CRC polynomial as well as the re-encoded SER and possibly the decoder Cumulative Metrics.

As was previously indicated, for the Set 1 of IS-95 data rates only the two higher data rates are protected by the CRC polynomial. As such, the determination of the 9600 and 4800 rates can be accomplished by using the CRC, while the determination of the 2400 and 1200 rates can be accomplished using the SER. It is well known that the error-detection capability of the CRC bits is largely determined by the degree r of $G_{(x)}$, or the number of CRC bits. In particular, any single-burst error of length r or less is detected. The number of undetected single-burst errors of length r+1 is ½, and that of the length greater than r+1 is ½.

Taking into consideration the reliability of the CRC, it is evident that it cannot be used independently as the only indicator of the transmitted data rate. As such an additional parameter, namely the SER, is typically considered. In this case the symbols are re-encoded, are compared with the received symbols, and the SER is calculated. The SER so calculated is then compared to a predetermined (for each rate) SER and is thus considered during the rate determination. However, since the SER can vary significantly (approximately 1% to 10% in fading), this criterion is extremely unreliable.

A last criterion that may be used in the rate determination process is the size of the Viterbi decoder Cumulative Path Metrics. However, in any particular implementation of the Viterbi algorithm for IS-95, the Cumulative Path Metrics must be normalized to allow for an efficient implementation. In this case, the comparison of the normalized Cumulative Path Metrics between the various data rates is very difficult and, as such, the confidence level associated with this parameter during the rate determination process is low.

These described rate determination schemes each require the Viterbi decoder to decode each frame at all four rates. The rate is then determined by checking for errors within each decoded frame (e.g., checking the CRC or SER). That is, an error checking scheme is implemented to determine which decoded frame contains the fewest errors. Unfortunately, this rate determination scheme requires the use of significant decoder resources since each frame is decoded at all four rates.

In view of the foregoing, there is a need for improved methods and apparatus for determining the rate of variable rate encoded signals. Specifically, there is a need for methods and apparatus that reduce decoder overhead and decoding time.

SUMMARY OF THE INVENTION

Accordingly, the present invention provides an apparatus and method for determining the rate of a variable rate encoded data frame.

In one aspect of the present invention, a rate determination unit for use in a receiver in a communication system that is adapted to receive communications at a plurality of different data rates is disclosed. The rate determination unit is configured to receive an encoded signal and determine the encoded signal's data rate without first requiring decoding of the encoded signal. Preferably, the communication system is a code division multiple access based cellular telephone system and employs symbol repetition to maintain a constant symbol rate.

In a preferred embodiment, the communication system is a frame based system having a sequence of data frames each having a plurality of symbols, and the rate determination unit is arranged to determine the frame data rate of each data frame. Additionally, the rate determination unit includes a plurality of hypothesis units and a hypothesis analyzer. Each hypothesis unit is arranged to determine a hypothesis value for a frame of the encoded signal at an associated one of the data rates. The hypothesis analyzer is arranged to compare selected hypothesis values, determine the frame data rate based on such comparisons, and output a rate indication signal based on the determined frame data rate. Preferably, a first one of the hypothesis units is arranged to sum a first plurality of absolute values that are associated with discrete samples, and a second one of the hypothesis units is arranged to sum a second plurality of absolute values. Each of the second plurality of absolute values is a sum of a plurality of samples.

In another aspect of the invention, a receiver for receiving a radio frequency signal that includes a user communication is disclosed. The user communication is transmitted in frames of data bits, and each of the frames is transmitted with a data rate selected from a set of data rates that includes a highest rate and a lowest rate. The receiver includes a demodulator configured to demodulate the user communication, a rate determination unit configured to receive the demodulated user communication and determine a rate of the demodulated user communication, and a decoder configured to decode the demodulated user communication based on the determined rate. The rate determination unit is arranged to determine the data rate of the demodulated user communication without requiring prior decoding of the demodulated user communication.

In yet another aspect of the invention, a method of determining a rate of an encoded signal having a plurality of symbols is disclosed. The encoded signal is transmitted at a selected one of a plurality of data rates. A plurality of hypothesis values that are each associated with one of the data rates are determined. A first set of selected hypothesis values are compared to determine whether the transmission rate is equal to a first one of the plurality of data rates. The determination is accomplished prior to decoding of the encoded signal. In a preferred method aspect, the encoded signal is then decoded based on the determined rate.

Preferably, the comparison is accomplished by determining a plurality of ratios associated with the first set of selected hypothesis values and comparing each determined ratio to an associated predefined ratio. In another preferred embodiment, the first data rate is defined as the determined rate when each determined ratio is less than about the associated predefined ratio.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 6A is a diagrammatic representation of a first example of four soft symbol data signals at four different rates with corresponding H values that have been determined at the correct rate.

DETAILED DESCRIPTION OF THE PREFERRED EMBODIMENTS

Reference will now be made in detail to the preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the invention.

In general, the present invention includes apparatus and techniques for deter mining the rate of an encoded signal prior to decoding the encoded signal. The determined rate may then be used by a decoder to decode the encoded signal at the determined rate. Thus, the encoded signal only has to be decoded at one rate, the determined rate. As a result of only decoding at the determined rate, the present invention allows for significant reductions in decoding time, power consumption, and decoder complexity.

The present invention may be implemented on any suitable type of receiver that receives variable rate encoded signals. The receiver may be integral to any suitable type of communication system. To better illustrate the features of the present invention, several embodiments are described below in the context of a code division multiple access (CDMA) cellular system. Although these embodiments are described below in terms of a CDMA cellular system, of course, the present invention may be implemented on any other type of communication system, such as personal communication systems (PCS), third generation wide-band CDMA systems, or other systems. These examples are merely illustrative and are not meant to limit the scope of the invention.

Figure 1A:
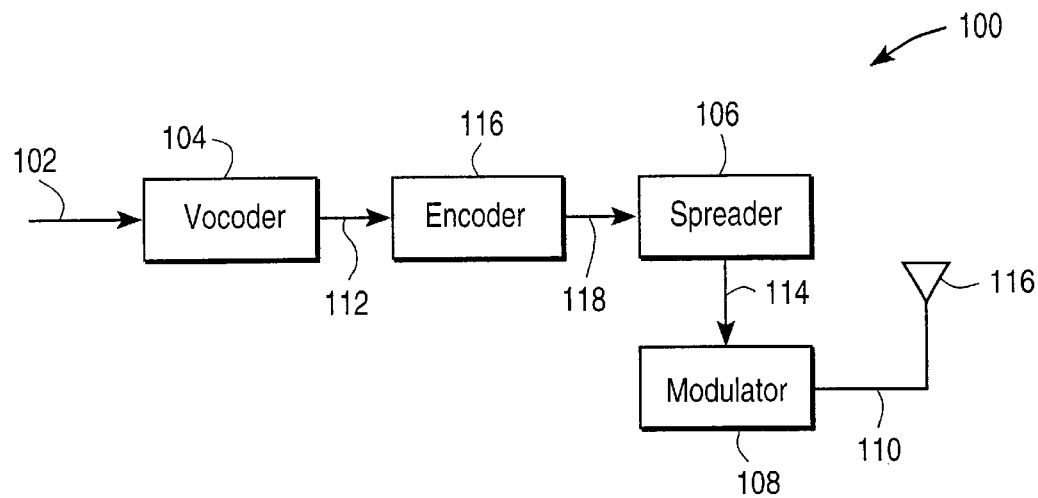
FIG. 1A is a simplified diagrammatic representation of a portion of a variable rate transmitter in accordance with one embodiment of the present invention.

FIG. 1A is a simplified diagrammatic representation of a portion of a variable rate transmitter 100 in accordance with one embodiment of the present invention. As shown, the transmitter 100 includes a vocoder 104, an encoder 116, a spreader 106, an RF modulator 108, and a transmit antenna 116. The vocoder 104 is configured to receive a user communication 102 and output vocoder data 112 to the encoder 116. The encoder 116 is configured to receive the vocoder data 112 and output encoded data 118 to the spreader 106. The spreader 106 is configured to receive the encoded data 118 and output a spread signal 114 to the RF modulator 108. The RF modulator is configured to output a modulated encoded signal 110 to the antenna 116. The antenna 116 is configured to transmit the encoded signal 110 through the air to a receiver.

The user communication 102 may be in any suitable form. For example, a user may speak into a microphone (not shown), and the speech is converted into a digital voice signal. By way of another example, the user communication 102 may be in the form of other non-voice digital data, such as Internet data. The non-voice data may be combined with voice data or transmitted alone as user communication 102.

In brief, the vocoder 104 is configured to encode the user data 102 for formatting into a plurality of frames of various data rates. The vocoder 104 selects a rate for each frame based on the amount of speech activity at the transmitter, while for data transfer, the rate depends on the type of payload carried. The spreader 106 is configured to generate a spread spectrum signal 114 based on the vocoder data 2. Of course, the spreader 106 is not required if another transmission scheme (e.g., non-spread spectrum), besides CDMA, is utilized, such as TDMA. The modulator 108 is configured to incorporate the spread signal within an encoded radio frequency (RF) signal 110 so that the user communication may be transmitted through the air to a receiver.

Preferably, the transmitter operates in accordance with the TIA/EIA Interim Standard, Mobile Station-Base Station Compatibility Standard for Dual-Mode Wideband Spread Spectrum Cellular System, TIA/EIA IS-95 (July 1993). However, conformance with this standard is not to be considered a limitation upon the practice of this invention. Under IS-95, CDMA systems currently use either Rate Set 1 (full rate 9600, half rate 4800, quarter rate 2400, and eighth rate 1200 bps) or Rate Set 2 (14,400, 7200, 3600, and 1800 bps). Thus, for Rate Set 1, a frame contains 192, 96, 48, and 24 data bits for full, half, quarter, and eighth rate respectively. For Rate Set 2, a frame contains 288, 144, 72, and 36 data bits, respectively.

Although the present invention is described in terms of specific rate values, these rates may change as CDMA systems evolve or other new types of communications systems are developed and implemented. That is, the present invention is applicable to other rates. Additionally, although the present invention is discussed with respect to four rates, the present invention is also applicable to a lesser or greater number of rates.

Rate Set 1 is encoded by the rate ½ convolutional code, and Rate Set 2 is encoded by the rate ¾ convolutional code. This allows for the same number of encoded symbols (or data bits) per frame for a similar sub-rate for both rate sets. That is, each rate set frame will have 384, 192, 96, and 48 data bits or symbols for the full, half, quarter, and eighth sub-rates.

As mentioned above, all frames are 20 ms in duration for IS-95 forward channel (transmitted encoded data). In order to maintain a constant bit rate of 19.2 kHz (384 symbols/20 ms), the symbols are repeated twice for the half rate, four times for the quarter rate, and eight times for the eighth rate. Additionally, each symbol has a transmit power that is 3 dB lower than full rate transmitted power for each consecutive lower data rate (−3 dB for half rate, −6 dB for quarter, and −9 dB for eighth).

FIGS. 2A through 2D are diagrammatic representations of four examples of transmitted symbol amplitudes (or power levels) for each rate in accordance with one embodiment of the present invention. As shown, each symbol may have a negative value amplitude for a 1 bit, or a positive amplitude for a 0 bit. Each set of symbol data for a particular rate have the same encoded data. For example, a plurality of symbols transmitted at full rate 120 include a 0, 1, and 0 bit (S1, S2, and S3 respectively). Likewise, the other rate examples each include a 0, 1, and 0 bit, wherein each bit is repeated twice for the ½ rate, four times for the ¼ rate, and eight times for the ⅛ rate.

The symbols for each rate have different amplitudes. For example, each of the symbols for the full rate transmission 120 have a maximum absolute amplitude (S1 at +1, S2 at −1, and S3 at +1). The half rate transmission 122 includes three pairs of symbols (two S1 symbols, two S2 symbols, and two S3 symbols), and each repeated symbol (e.g., S1) is transmitted at an absolute power level that is 3 dB lower than the maximum amplitude of the full rate symbols. Likewise, the quarter rate symbols 124 include repeated symbols with power levels that have associated amplitudes that are each 6 dB lower than the maximum amplitude. Similarly, the repeated symbols at eighth rate 126 have amplitudes that are 9 dB lower than the maximum amplitude of the full rate symbols.

Although the present invention is described in terms of using transmitted signals that vary in power levels in increments of 3 dB depending on the rate, of course, the present invention may be implemented with transmitted signals with power levels that vary at different amounts. Additionally, although the present invention has been described in terms of implementing a transmitted signal that has either a +1 or −1 amplitude value for encoding binary 0's and 1's at full rate, of course, other amplitudes may be used to encode the binary data.

Figure 1B:
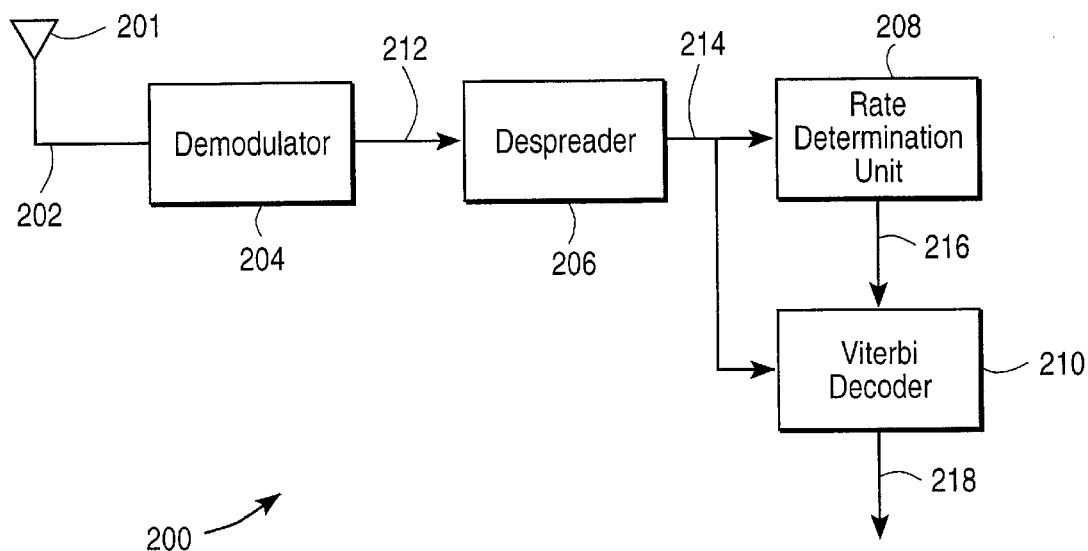
FIG. 1B is a simplified diagrammatic representation of a portion of a variable rate receiver in accordance with one embodiment of the present invention.
Figure 2A:
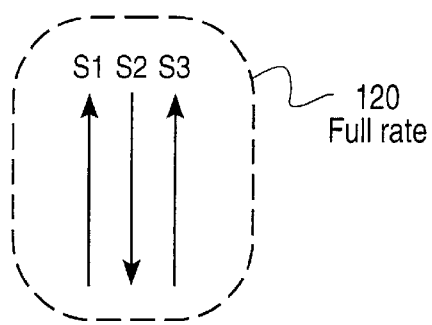
FIGS. 2A through 2D are diagrammatic representations of four examples of transmitted symbol amplitudes (or power levels) for each rate in accordance with one embodiment of the present invention.
Figure 2B:
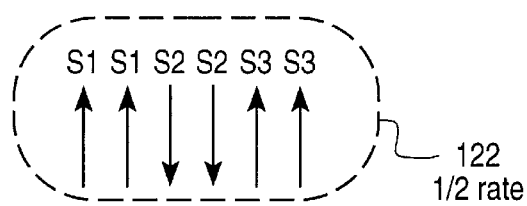
Figure 2C:
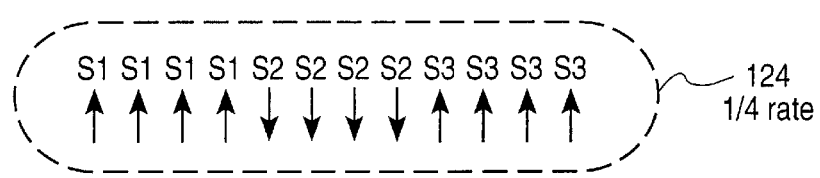
Figure 2D:
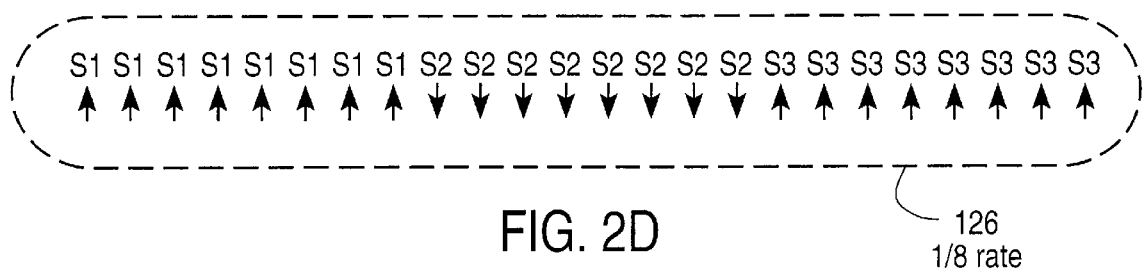

FIG. 1B is a simplified diagrammatic representation of a portion of a variable rate receiver 200 in accordance with one embodiment of the present invention. The receiver portion 200 may be implemented within a mobile station receiver or a base station receiver, for example. As shown, the receiver portion 200 includes an antenna 201, a demodulator 204, a despreader 206, a rate determination unit 208, and a decoder 210.

In general terms, the antenna 201 is configured to receive an encoded signal 202 (e.g., that is sent from transmitter 100) and relay the encoded signal 202 to the demodulator 204. The demodulator 204 is configured to receive the encoded signal 202 and to demodulate the encoded data 202 and output demodulated encoded data 212 to the despreader 206.

The despreader 206 is configured to receive the demodulated encoded data 212, despread the encoded data, and output soft symbol data 214 to both the rate determination unit 208 and decoder 210. The de-spread encoded data 214 may be in the form of either "soft" symbol data or "hard" data. Additionally, a despreader 206 is not required if the encoded data uses a transmission scheme that does not use a spread spectrum approach.

The rate determination unit 208 is configured to receive the soft symbol data 214 and determine a transmitted rate for the soft symbol data 214. The rate determination unit 208 is further configured to output a rate indication signal 216 to the decoder 210. Any suitable type of decoder may be implemented, such as a Viterbi decoder. The decoder 210 is configured to output decoded data 218 based on the rate indication signal 216. That is, the soft symbol data 214 is only decoded once for the indicated rate.

Figure 7:
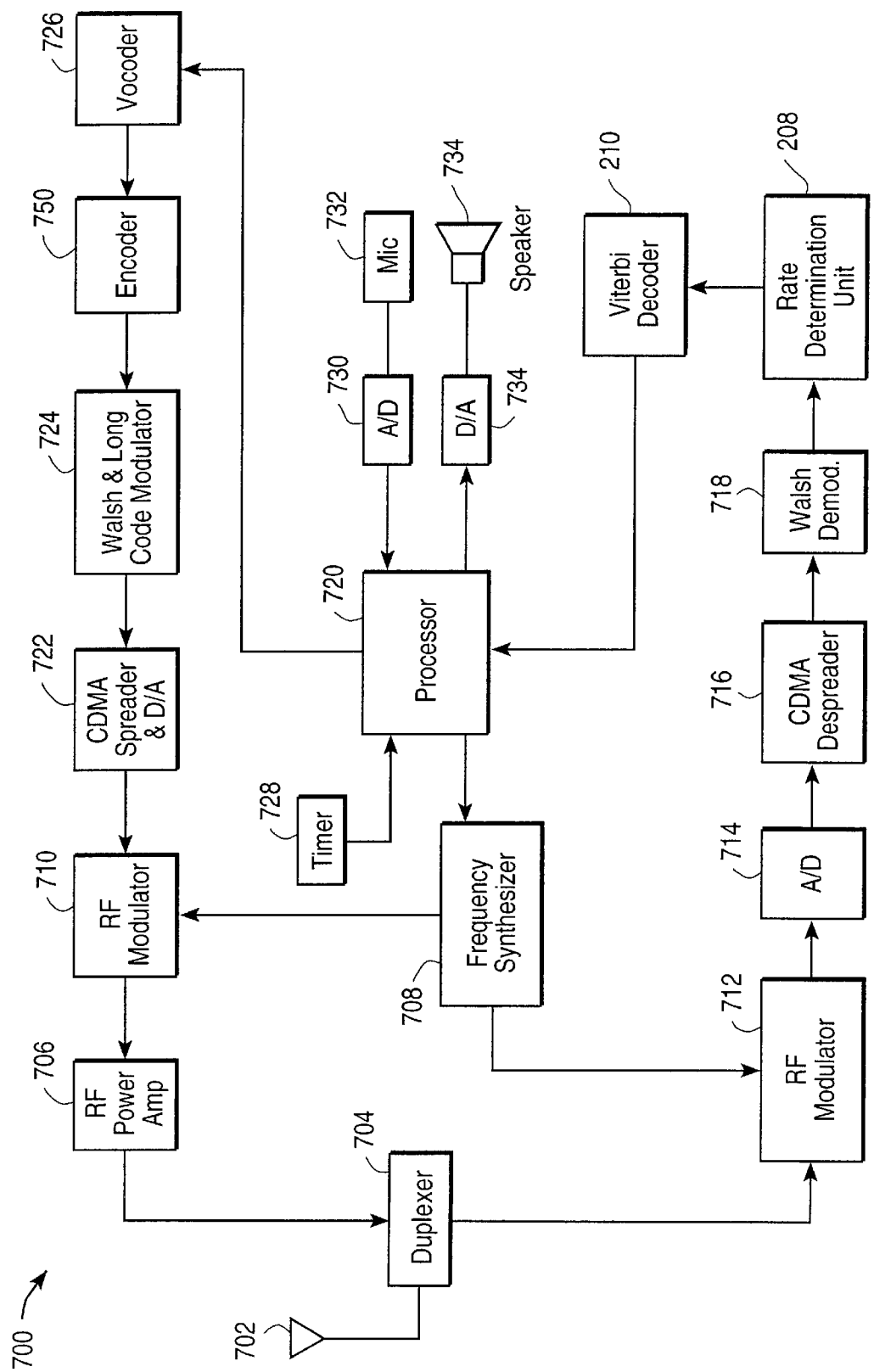
FIG. 7 is a diagrammatic representation of a spread spectrum cellular telephone system 700 in accordance with the rate determination methods and apparatus of the present invention.

The transmitter 100 and receiver 200 may form a portion of a cellular telephone system 700 as shown in FIG. 7, such as one compatible with the IS-95, Code Division Multiple Access (CDMA) specification. Other portions of the telephone system 700, shown in FIG. 7 and described below, include an analog to digital (A/D) converter for converting received data to a digital format and a processor for analyzing the decoded data or user communication data.

Figure 3:
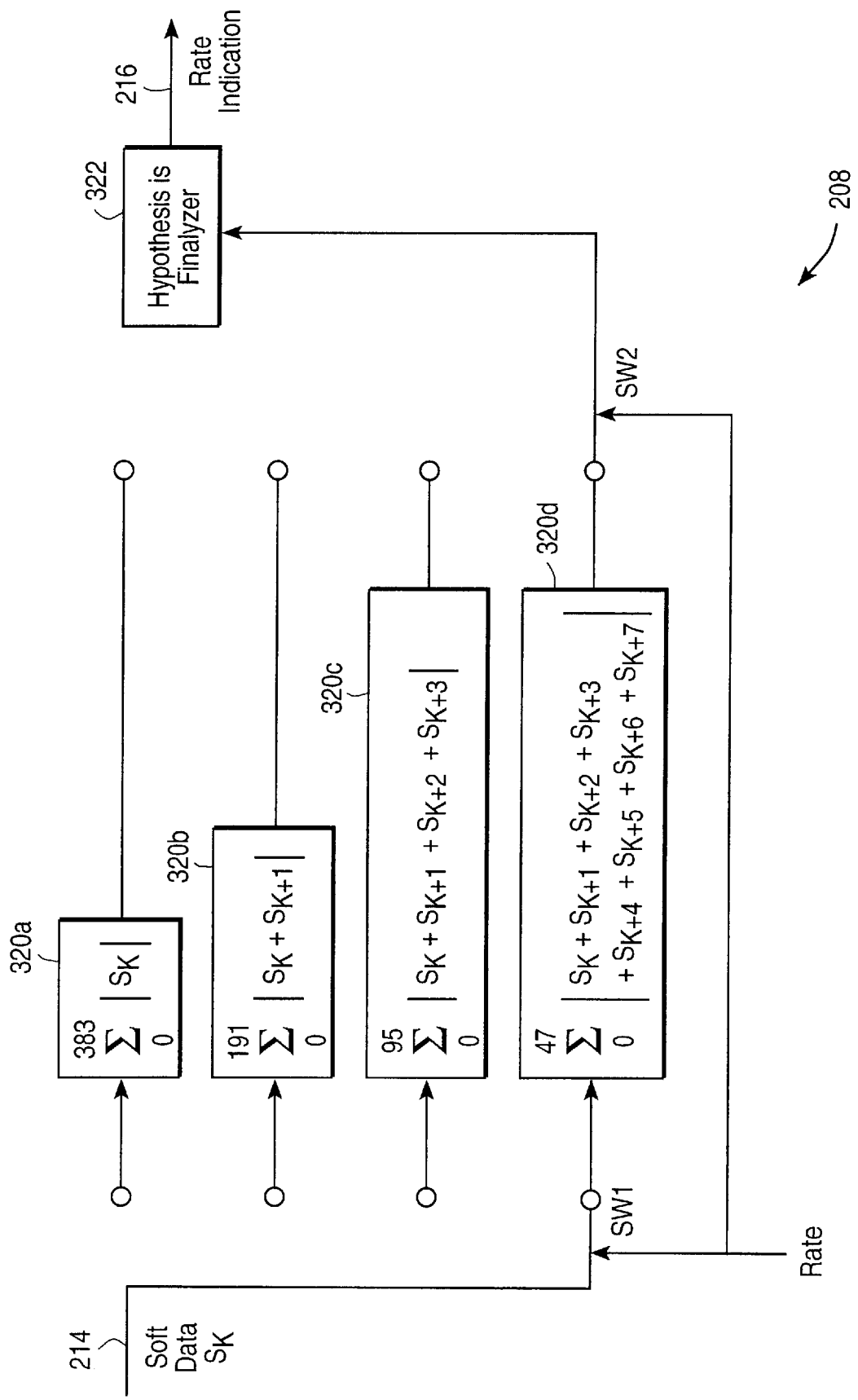
FIG. 3 is a diagrammatic representation of the rate determination unit 208 of FIG. 1B in accordance with one embodiment of the present invention.

FIG. 3 is a diagrammatic representation of the rate determination unit 208 of FIG. 1B in accordance with one embodiment of the present invention. As shown, the rate determination unit 208 includes a plurality of hypothesis units (e.g., 320a through 320d) and a hypothesis analyzer 322. Switches S1 and S2 are controlled by a rate signal so as to couple the inputs of the hypothesis units 320a through 320d to the soft data 214, and to couple the outputs of the hypothesis units to the hypothesis analyzer 322. Alternatively, switches S1 and S2 may not be required if the hypothesis units are configured to receive the soft data, calculate the hypothesis values, and output to the hypothesis analyzer 322 in parallel.

A plurality of hypothesis values are calculated, and each hypothesis value is associated with a particular rate. For example, $H_F$, $H_{1/2}$, $H_{1/4}$, and $H_{1/8}$ are associated with full, half, quarter, and eighth rates, respectively. The hypothesis values are based on a predetermined sampling rate, which in the described embodiment is equal to the full symbol rate. For a full rate, the hypothesis unit 320a sums the absolute values of the amplitudes of each of the samples (symbols) within a frame. For a half rate, the hypothesis unit 320b first calculates an amplitude sum for each sequential pair of samples. Next, the hypothesis unit 320b sums the absolute values of the calculated sample pair amplitude sums. If the actual transmission rate is half rate, each sample pair includes two repeated symbols since each symbol is repeated twice for half rate.

The hypothesis values for the quarter rate and eighth rate are similarly determined by hypothesis units 320c and 320d. For quarter rate, the hypothesis unit 320c first calculates an amplitude sum for each sequential quartet of samples. Next, the hypothesis unit 320c sums the absolute values of the calculated sample quartet amplitude sums. If the actual transmission rate is quarter rate, each sequential quartet sum includes four repeated symbols since each symbol is repeated four times at quarter rate.

For an eighth rate, the hypothesis unit 320d first calculates an amplitude sum for each sequential octet of samples. Next, the hypothesis unit 320d sums the absolute values of the calculated sample octet amplitude sums. If the actual transmission rate is eighth rate, each sequential octet sum includes eight repeated symbols since each symbol is repeated eight times at eighth rate. The hypothesis values may be calculated, for example, by the following set of equations:

$$H_F = \sum_{k=0}^{383} |S_k|$$

$$H_{1/2} = \sum_{k=0,2}^{382} |S_k + S_{k+1}|$$

$$H_{1/4} = \sum_{k=0,4}^{380} |S_k + S_{k+1} + S_{k+2} + S_{k+3}|$$

$$H_{1/8} = \sum_{k=0,8}^{376} |S_k + S_{k+1} + S_{k+2} + S_{k+3} + S_{k+4} + S_{k+5} + S_{k+6} + S_{k+7}|$$

In the above equations, "k=0,2" means that the first k is equal to 0 and the next k is equal to 2. For example, the $H_{1/2}$ is calculated by first summing the first two symbols ($S_0+_1$), then summing the next two symbols ($S_2+S_3$), etc. Next, the absolute values of these summed pairs are summed.

The hypothesis analyzer 322 then reads each hypothesis value output from the hypothesis units 320 and analyzes the hypothesis values to determine the transmitted rate of the soft symbol data 214. Each transmission rate is expected to result in a particular set of H value ratios. That is, for a particular transmission rate, a particular H value is expected to vary from each of the other H values by one of a plurality of predetermined values. Thus, the hypothesis analyzer may sequentially compare a particular H value to other H values and determine whether the particular H value varies enough from each of the other H values. Specific examples of H value results are described below in reference to FIGS. 6A and 6B.

When the hypothesis analyzer 322 finds a set of particular H values that satisfies the above comparison requirements, the rate associated with the particular set of H values is defined as the determined rate. After a determined rate is defined by the hypothesis analyzer, no other H values are analyzed for different rates. The hypothesis analyzer then outputs the rate indication signal 216, which indicates the determined rate, to the decoder 210 (FIG. 1B).

Figure 4:
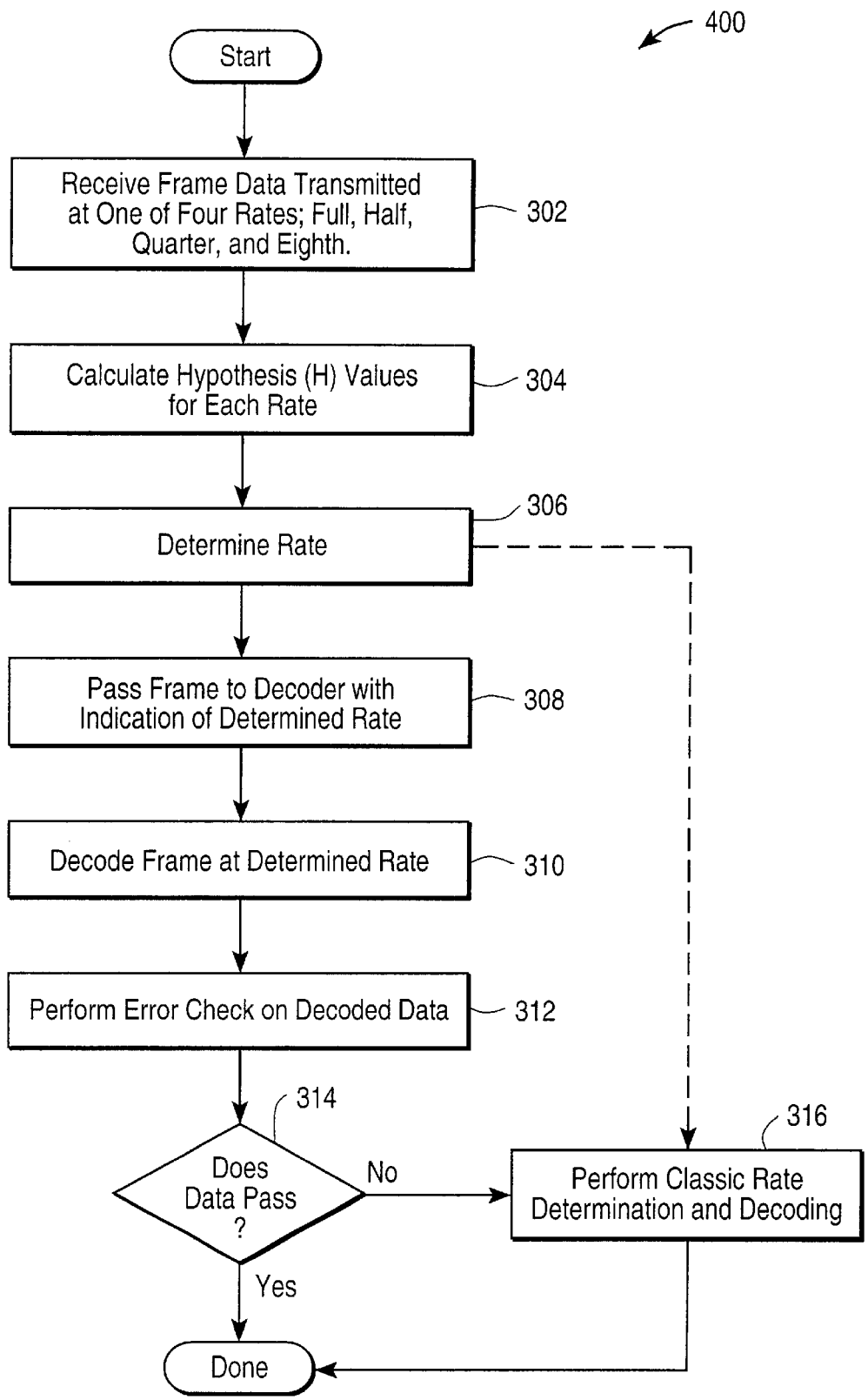
FIG. 4 is a flowchart illustrating a process of determining the rate for a frame and decoding the frame based on the determined rate in accordance with one embodiment of the present invention.

FIG. 4 is a flowchart illustrating a process 400 of determining the rate for a frame and decoding the frame based on the determined rate in accordance with one embodiment of the present invention. Initially, in operation 302 soft symbol data for one frame is received. In one embodiment, the frame is transmitted at a selected one of four rates: full, half, quarter, or eighth rate. The transmission rate is unknown by the receiver.

After the frame is received, H values are calculated for each one of the four rates in operation 304. In operation 306, the rate is determined. However, it is possible, though unlikely, that the determined rate for the received frame is incorrect or cannot be determined and the process proceeds to operation 316, which is discussed below.

After the rate is determined, the frame data is passed to the decoder, along with an indication of the determined rate in operation 308. The decoder then decodes the frame data based on the determined rate in operation 310. In other words, data is extracted from the frame based on the determined rate.

After the frame data is decoded, an error check procedure may be performed to verify that data was decoded at the correct rate (operation 312). Any suitable error check method may be used, such as checking the CRC bit, which is appended to some of the frame data (e.g., full and ½ rate data). It is then determined whether the frame data passes the error check in operation 314. If the frame data was decoded at the correct rate, the decoded data will likely pass the error check, and the process ends.

However, if the frame data was decoded at the wrong rate, the decoded data will likely fail the error check, and conventional rate determination and decoding methods may then be performed in operation 316. That is, the frame data is then decoded for each of the other, undetermined rates. However, since one rate has already been eliminated as the correct rate (the determined rate), the decoder only needs to decode the remaining three rates.

Figure 5:
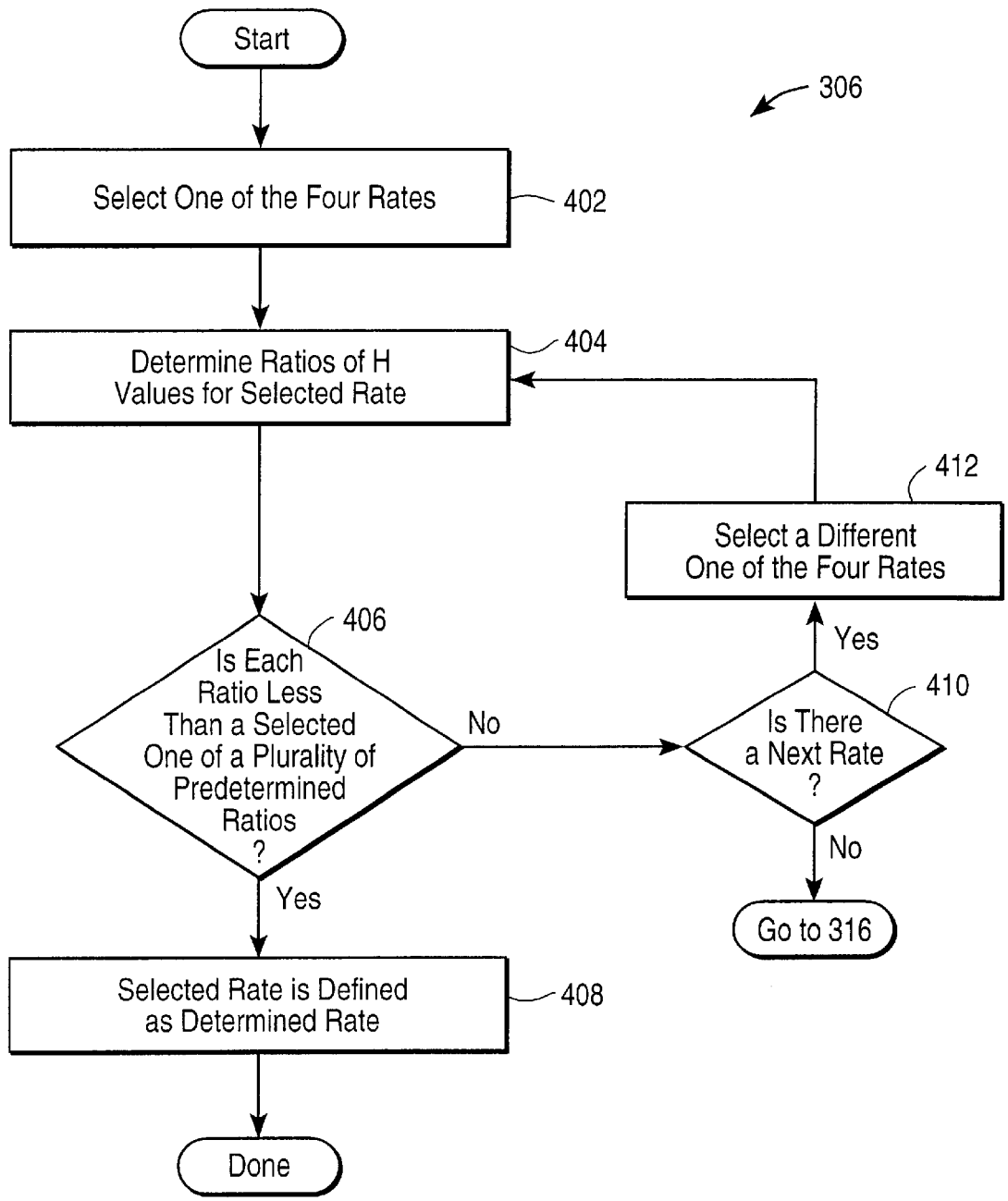
FIG. 5 is a flowchart illustrating the process of FIG. 4 of determining the rate for a particular frame of data in accordance with one embodiment of the present invention.

FIG. 5 is a flowchart illustrating the process 306 of FIG. 4 of determining the rate for a particular frame of data in accordance with one embodiment of the present invention. Initially, one of the four rates is selected in operation 402. In operation 404, as described above, the H ratios for the selected rate are then determined. It is then determined whether each ratio is less than a selected one of a plurality of most likely predetermined ratio values in operation 406.

The most likely ratio values are predetermined through experimentation, and are selected to maximize the probability that the correct rate is determined. One suitable set of most likely or expected ratios are presented below in Table 1. These expected ratios have been found to work well for determining the rate in a particular order (e.g., by first evaluating the eighth rate ratios, then evaluating the quarter rate ratios, and then evaluating the half rate ratios).

TABLE 1

| Rate | first ratio | second ratio | third ratio |
|---|---|---|---|
| eighth | $H_F/H_{1/8} < 2.0$ | $H_{1/2}/H_{1/8} < 1.5$ | $H_{1/4}/H_{1/8} < 1.2$ |
| quarter | $H_F/H_{1/4} < 1.5$ | $H_{1/2}/H_{1/4} < 1.2$ | — |
| half | $H_F/H_{1/2} < 1.2$ | — | — |

In this example, the determined ratios are expected to be less than one of three predefined ratio values: 2.0, 1.5, or 1.2. For example, as shown in Table 1, for eighth rate evaluation, the $H_{1/4}/H_{1/8}$ ratio is expected to be less than about 1.2 (the first ratio). Likewise, for quarter rate evaluation, the $H_{1/2}/H_{1/4}$ ratio is expected to be less than about 1.2, and for the eighth rate determination the $H_F/H_{1/8}$ ratio is expected to be less than about 1.2. In these three cases, all three ratios have a first rate over a second rate that is half the first rate, and the ratio is expected to be less than about the first threshold.

If the ratio has a first rate over a second rate that is a quarter of the first rate, the ratio is expected to be less than about 1.5 (the second ratio). If the ratio has a first rate over a second rate that is an eighth of the first rate, the ratio is expected to be less than about 2.0 (the third ratio).

The predefined ratios may be any suitable values that facilitate rate determination. In the above example where the eighth rate is evaluated first, it has been found that a first range between about 1.15 and 1.25 works well for the first ratio. Additionally, it has been found a second range between about 1.4 and 1.55 works well for the second ratio and a third range between about 1.85 and 2.05 works well for the third ratio. However, due to clipping and scaling effects, these ratio values may vary.

The rates may be selected in any suitable order. However, since voice activity factor is only about 0.5, more frames of voice communications will be transmitted at the lowest transmission rate than at higher rates. Thus, it is preferable to evaluate the lowest rate (eighth rate) first since it has the highest probability of being the frame rate. If it is then determined that the lowest rate is the transmitted frame rate, the frame does not have to be evaluated at the other rates. Alternatively, the rates may be analyzed in the reverse order (e.g., by first evaluating the full rate ratios).

Turning back to FIG. 5, if the ratios meet the predetermined ratio requirements, the selected rate is defined as the determined rate in operation 408 and the process 306 ends. However, if the ratios fail to meet the predetermined value requirements, it is determined whether there is another rate to analyze in operation 410. If there is another rate to analyze, another rate is selected and analyzed in operations 412 through 406. These operations are repeated for each new rate selection. One example is illustrated by the following pseudo code:

IF ($H_F/H_{1/8}<2.0$ and $H_{1/2}/H_{1/8}<1.5$ and $H_{1/4}/H_{1/8}<1.2$)
   THEN determined rate=eighth rate
ELSE IF ($H_F/H_{1/4}<1.5$ and $H_{1/2}/H_{1/4}<1.2$)
   THEN determined rate=quarter rate
ELSE IF ($H_F/H_{1/2}<1.2$)
   THEN determined rate=half rate
ELSE determined rate=full rate.

Alternatively, the a pseudo code may be implemented for a reverse order rate determination procedure.

If there are no new rates to select and no rate has been defined as the determined rate, the process may jump to operation 316 of FIG. 4, and as described above, conventional rate determination and decoding techniques may then be implemented. Alternatively, each rate may be selected and analyzed, except for a last one of the rates (e.g., as shown above in the pseudo code for full rate). If the analyzed rates are not defined as the determined rate, the last rate may then be defined as the determined rate without any further analysis. In other words, the last rate is defined as the determined rate by default. Of course, expected ratio values would be unnecessary for the last rate in this alternative embodiment.

By way of illustration, the actual eighth rate ratios are first compared to the eighth rate's expected ratio values, examples of which are listed in Table 1. If the eighth rate ratios do not meet the expected range of expected ratio values, the actual quarter rate ratios are then compared to the quarter rate's expected ratio values (see Table 1). If the quarter rate ratios do not pass, the half rate ratio is similarly compared. However, if the half rate ratio is not within the expected ratio range as shown in Table 1, for example, the full rate is defined as the determined rate.

FIG. 6A is a diagrammatic representation of a first example of hypothesis (H) value calculations. As shown, a first set of symbol data 602 is transmitted at full rate and at maximum positive and negative amplitudes (e.g., +1 and −1). Each soft symbol data signal represents only a portion of the frame. Each symbol has either a positive maximum amplitude, which represents a bit value of 0, or a negative maximum amplitude, which represents a bit value of 1.

As shown, the symbol data 602 includes S1 at +1, S2 at −1, and S3 at +1. If an H value that is associated with full rate is calculated from the full rate symbol data 602, the H value equals a sum of the absolute values of the amplitudes of S1 through S3. That is, since the absolute values of S1, S2, and S3 are all equal to one, the $H_F$ value is equal to three.

The other sets of symbols have the same bit values as the full rate, but each symbol is repeated twice for the ½ rate, four times for the ¼ rate, and eight times for the ⅛ rate and each symbol is transmitted at a lower amplitude than the maximum amplitude of full rate. Thus, if the bit values are transmitted at half rate (see 122), an $H_{1/2}$ value of three will also be calculated. That is, each pair of symbols are summed and then a sum of the absolute values of each summed pair is calculated.

As described above, symbols that are transmitted at half rate will have an amplitude that is 3 dB less than the amplitude of the full rate symbols. Thus, when the amplitudes of the repeated symbols are summed (e.g., S1+S1), they add up to about the maximum amplitude value of the full rate symbols (e.g., one). As shown, an amplitude 612a of the first S1 is added to an amplitude 612b of the second repeated S1. Likewise, the two S2 amplitudes and two S3 amplitudes are summed and each sum is equal to one. Thus, the $H_{1/2}$ value is equal to three ($|S1+S1|+|S2+S2|+|S3+S3|$). The $H_{1/4}$ and $H_{1/8}$ values are similarly determined as shown by examples 614 and 616, respectively.

Figure 6B:
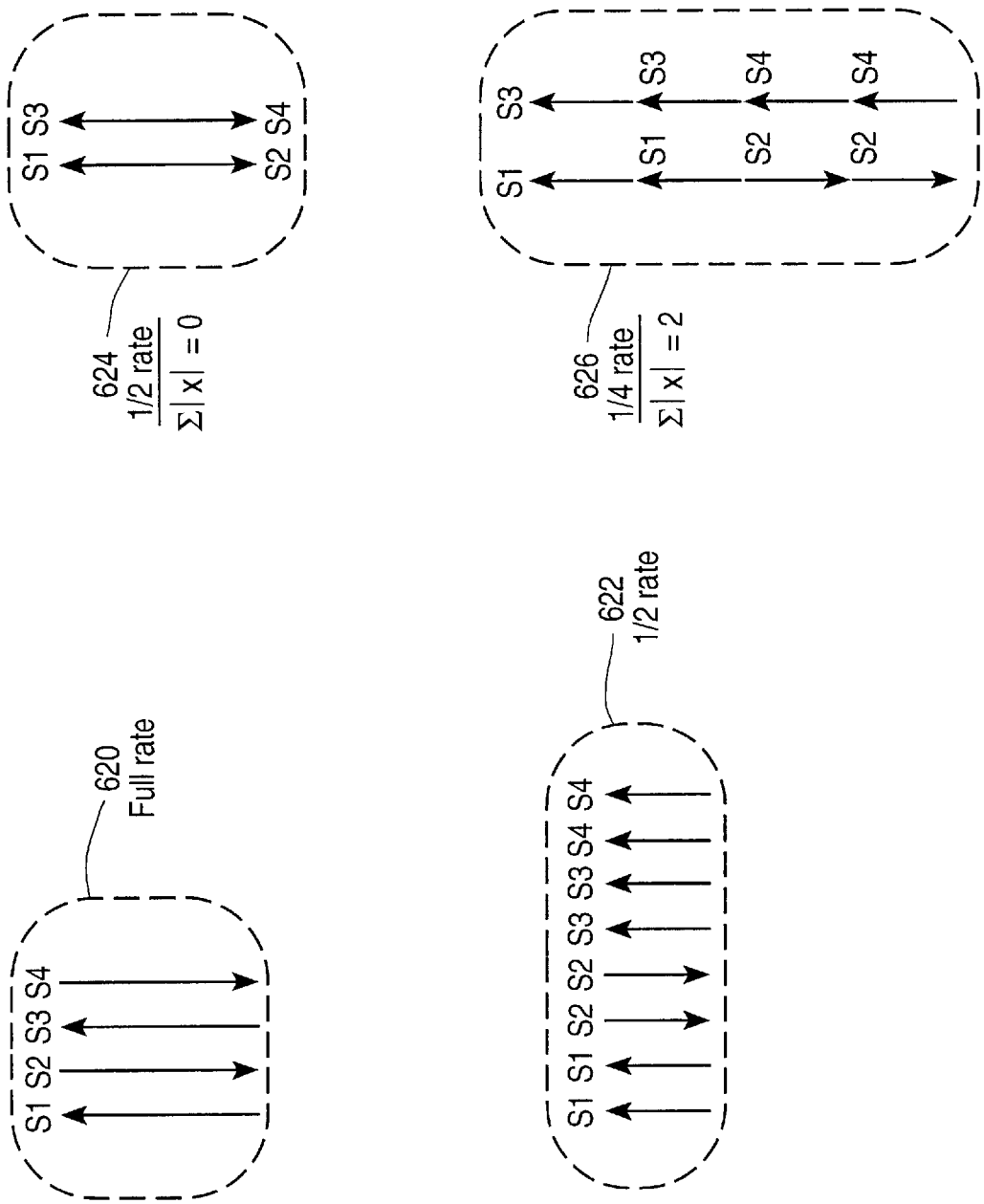
FIG. 6B is a diagrammatic representation of a second example of two soft symbol data signals at two different rates with corresponding H values that have been determined at an incorrect rate.

FIG. 6B is a diagrammatic representation of a second example of hypothesis (H) value calculations. As shown, a first set of symbol data 620 is transmitted at full rate. The first symbol data 620 includes S1 at +1, S2 at −1, S3 at +1, and S4 at −1. If the $H_{1/2}$ value associated with half rate is calculated, the result is equal to zero (S1+S2 =0 and S3+S4= 0). Note, that the $H_F$ value associated with full rate would be equal to the absolute amplitude values of S1+S2+S3+S3, which is equal to four.

Likewise, if a second set of symbols 622 are transmitted at half rate and the $H_{1/4}$ value associated with quarter rate is determined, the result will be equal to two (S1+S1 +S2+ S2=0 and S3+S3+S4+S4=2). Note, that the $H_{1/2}$ value associated with half rate would be equal to four. The H values that are associated with the transmitted rate usually have a significantly higher value than the H values associated with other rates, excluding, of course, $H_F$ which will always have the greatest value. This is primarily due to cancellation of opposite value symbols.

In an alternative embodiment, noise effects may be taken into account. Due to an imperfect transmission environment, the received symbols will also include a noise component. Since the absolute value of a symbol or a sum of symbols is accumulated to form the rate hypothesis, a positive bias is added to the hypothesis. However, in an alternative embodiment, in calculating each hypothesis value, rather than adding the absolute values of the sum of each pair, quartet, or octet of symbols (as described above), the sum itself can be used when half of the symbols in the sum are positive and half of the symbols are negative. This minor change helps to reduce the bias, and may slightly change the above predetermined ratio values.

Referring to FIG. 7, there is illustrated a spread spectrum cellular communication system 700 suitable for implementing the described rate determination units. Certain ones of the blocks of the communication system 700 may be implemented with discrete circuit elements, or as software routines executed by a suitable digital processor, such as a high speed signal processor. Alternatively, a combination of circuit elements and software routines may be employed. As such, the ensuing description is not intended to limit the application of this invention to any one particular technical embodiment.

In the preferred embodiment of this invention, the spread spectrum telephone system 700 operates in accordance with the TIA/EIA IS-95. However, compatibility with this particular interim standard is not to be considered a limitation upon the practice of this invention.

The communication system includes an antenna 702 for receiving RF signals from a cell site, hereafter referred to as a base station (not shown), and for transmitting RF signals to the base station. The RF signals are phase modulated to convey speech and signaling information. Coupled to the antenna 702 is a duplexer 704 for duplexing received and transmitted phase modulated RF signals.

The received RF signals are downconverted and applied to a phase demodulator 712 which derives in-phase (I) and quadrature (Q) signals from the received signal. The I and Q signals are converted to digital representations by suitable A/D converters 714. The output of the A/D converter 714 is applied to a CDMA de-spreader 716 and Walsh demodulator 718, which further prepares the received signal for analyzing.

The output of the Walsh demodulator 718 is then applied to the rate determination unit 208 of this invention, which outputs a rate indication signal to the Viterbi decoder 218 of this invention. The Viterbi decoder 210 outputs a digital signal to a processor 720 that is configured to analyze the digital signal. The digital signal is expressive of speech samples or signaling information and, in accordance with the teaching of this invention, the rate at which a frame of data is received.

The communication system 700 also includes a vocoder 726 for performing speech encoding of digital data from the processor 720 to be transmitted in the form of a modulated RF signal out of the antenna 702. The output from the vocoder 726 is sent to an encoder 750 that is configured to perform further convolutional encoding and output an encoded signal. A Walsh and long code modulator 724 that is configured to receive the encoded signal from the encoder 750 and output a modulated signal to a CDMA spreader and D/A converter 722. The CDMA spreader and D/A converter 722 are configured to output a spread spectrum signal to a RF modulator 710. The RF modulator is configured to output an RF modulated signal to a RF power amplifier 706 that is configured to transmit the RF modulated signal at sufficient power levels for the particular cell size of the communication system 700.

In sum, framed speech and/or signaling is convolutionally encoded and compressed. The framed speech is then Walsh and long code modulated and spread with a PN spreader. The output of the PN spreader is applied to a pulse shaping filter for band limitation, D/A converted, AGC (automatic gain control) controlled, modulated into I and Q signal components, and up-converted and applied to a transmission power amplifier.

The present invention has several advantages. For example, the rate determination unit of the present invention allows for rate determination prior to decoding. Thus, the frame data may be decoded at the determined rate, rather than for all possible rates as done by conventional decoder systems. Thus, the present invention allows for significant savings in decoder resources, decoding time, and power consumption.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. For example, all H values may always be compared to all other H values to determine the most likely correct rate.

By way of another example, the present invention may be implemented with a Walsh cover to aid rate determination. The Walsh cover inverts the second symbol of each pair for half rate, inverts the third and fourth symbol of each quartet for quarter rate, and inverts the last four symbols of each octet for eighth rate. When the correct cover is used in the demodulator to uncover the data, the sums used in the calculation of the rate hypothesis value should be closer to zero for the incorrect rates. This is, of course, not true for the full rate data. In this alternative embodiment, different predetermined ratio values would be required, but performance will likely be improved.

Accordingly, the present embodiments are to be considered as illustrative and not restrictive, and the invention is not to be limited to the details given herein, but may be modified within the scope and equivalents of the appended claims.

What is claimed is:

1. A rate determination unit for use in a receiver in a communication system that receives an encoded signal at a plurality of different data rates, the communication system being a frame based system having a sequence of data frames each having a plurality of symbols, the rate determination unit comprising:
   a first hypothesis unit to determine a first hypothesis value at an associated one of the data rates by summing a first plurality of absolute values, the first plurality of absolute values including an absolute value of each discrete symbol;
   a second hypothesis unit to determine a second hypothesis value at an associated one of the data rates by summing a second plurality of absolute values, each of the second plurality of absolute values being a sum of consecutive discrete symbols; and
   a hypothesis analyzer to compare selected hypothesis values and determined the frame data rate of each date frame based on such comparisons and output a rate indication signal based on the determined frame date rate.

2. A rate determination unit as recited in claim 1, wherein the communication system is a code division multiple access based cellular telephone system.

3. A rate determination unit as recited in claim 1, further comprising:
   a third hypothesis unit to determine a third hypothesis value at an associated one of the data rates by summing a third plurality of absolute values, each of the third plurality of absolute values being a sum of four consecutive discrete symbols.

4. A rate determination unit as recited in claim 1, further comprising:
   a fourth hypothesis unit to determine a fourth hypothesis value at an associated one of the data rates by summing a fourth plurality of absolute values, each of the fourth plurality of absolute values being a sum of eight consecutive discrete symbols.

5. A rate determination unit as recited in claim 4, wherein the hypothesis analyzer compares ratios of the selected hypothesis values to predetermined ratios to determine the frame data rate.

6. A rate determination unit as recited in claim 4, wherein the frame data rate is one selected from a group consisting of full, half, quarter, and eighth rate.

7. A rate determination unit as recited in claim 4, wherein the hypothesis analyzer compares the hypothesis values by determining whether a ratio of the hypothesis value associated with a first data rate to the hypothesis associated with a second data rate that is one half the first data rate is less than a threshold that has a threshold value in the range of approximately 1.5 to 1.75.

8. A rate determination unit as recited in claim 4, wherein the hypothesis analyzer compares the hypothesis values by determining whether a ratio of the hypothesis value associated with a first data rate to the hypothesis associated with a second data rate that is one fourth the first data rate is less than a threshold that has a threshold value in the range of approximately 1.4 to 1.55.

9. A rate determination unit as recited in claim 4, wherein the hypothesis analyzer compares the hypothesis values by determining whether a ratio of the hypothesis value associated with a first data rate to the hypothesis associated with a second data rate that is one eighth the first data rate is less than a threshold that has a threshold value in the range of approximately 1.85 to 2.05.

10. A rate determination unit as recited in claim 1, wherein the communications is voice data.

11. A rate determination unit as recited in claim 1, wherein the encoded signal is a soft data signal.

12. A rate determination unit as recited in claim 1, wherein the communication system employs symbol repetition to maintain a constant symbol rate.

13. A receiver that receives a radio frequency signal that includes a user communication, the user communication being transmitted in frames of data bits, each of the frames being transmitted with a data rate selected from a set of data rates that includes a highest rate and a lowest rate, the receiver comprising:
   a demodulator to demodulate the user communication;
   a rate determination unit as recited in claim 1 to receive the demodulated user communication; and
   a decoder to decode the demodulated user communication based on the determined rate, wherein the rate determination unit determines the data rate of the demodulated user communication.

14. A receiver as recited in claim 13, wherein the decoder is a Viterbi decoder.

15. A receiver as recited in claim 13, wherein the rate determination unit further comprises:
   a third hypothesis unit to determine a third hypothesis value for a frame at an associated one of the data rates by summing a third plurality of absolute values, each of the third plurality of absolute values being a sum of four consecutive discrete symbols; and
   a fourth hypothesis unit to determine a fourth hypothesis value for a frame at an associated one of the data rates by summing a fourth plurality of absolute values, each of the fourth plurality of absolute values being a sum of eight consecutive discrete symbols.

16. A receiver as recited in claim 15, wherein the first data rate is higher than the second data rate, the third data rate, and the fourth data rate associated.

17. A receiver as recited in claim 13, wherein the hypothesis analyzer a plurality of ratios of selected hypothesis values for comparison to a predetermined ratio.

18. A communication system that receives and transmits radio frequency signals that include user communications, the user communications being transmitted and received with a data rate selected from a set of data rates that includes a highest rate and lowest rate, the communication system comprising:
 a receiver as recited in claim 13;
 a transmitter to transmit radio frequency signals; and
 a processor to process decoded data from the receiver and user communications that are to be transmitted by the transmitter.

19. A communication system as recited in claim 18, wherein the radio frequency signals are code division multiple access (CDMA) radio frequency signals.

20. A receiver that receives a radio frequency signal that includes a user communication, the user communication being transmitted in frames of data bits, each of the frames being transmitted with a data rate selected from a set of data rates that includes a highest rate and a lowest rate, the receiver comprising:
 a demodulator to demodulate the user communication;
 a rate determination unit as recited in claim 1 to receive the demodulated user communication; and
 a decoder to decode the demodulated user communication based on the determined rate, wherein the rate determination unit determines the data rate of the demodulated user communication, wherein the hypothesis analyzer determines a plurality of ratios of selected hypothesis values for comparison to one of a group consisting of a first one of a plurality of predefined ratios, a second one of the plurality of predefined ratios, and a third one of the plurality of predefined ratios, wherein a, first one of the plurality of determined ratios is equal to the hypothesis value associated with a first rate over the hypothesis value associated with a second rate that is half the first rate and the hypothesis analyzer compares the first ratio to the first predefined ratio to determine the frame data rate.

21. A receiver as recited in claim 20, wherein the frame data rate is one from a group consisting of full, half, quarter, and eighth rate and the hypothesis analyzer determines whether the frame rate is equal to half rate.

22. A receiver as recited in claim 20, wherein a second one of the plurality of determined ratios is equal to the hypothesis value associated with a third rate over the hypothesis value associated with the second rate that is a fourth of the third rate and the hypothesis analyzer compares the second ratio to the second predefined ratio to determine the frame data rate.

23. A receiver as recited in claim 22, wherein the frame data rate in one from a group consisting of full, half, quarter, and eighth rate and the hypothesis analyzer determines whether the frame rate is equal to quarter rate.

24. A receiver as recited in claim 22, wherein a third one of the plurality of determined ratios is equal to the hypothesis value associated with a fourth rate over the hypothesis value associated with the second rate that is an eighth of the first rate and the hypothesis analyzer compares the third ratio to the third predefined ratio to determine the frame data rate.

25. A receiver as recited in claim 24, wherein the frame data rate in one from a group consisting of full, half, quarter, and eighth rate and the hypothesis analyzer determines whether the frame rate is equal to eighth rate.

26. A rate determination unit for use in a receiver in a communication system that receives an encoded signal at data rates consisting of full, half, quarter, and eighth rate, the communication system being a frame based system having a sequence of data frames each having a plurality of symbols, the rate determination unit comprising:
 a plurality of hypothesis units, each hypothesis unit to determine a hypothesis value for a frame of the encoded signal at an associated one of the data rates; and
 a hypothesis analyzer to compare selected hypothesis values and determine the frame data rate based on such comparisons and to:
  output a rate indication signal to indicate the eighth rate when a ratio of the hypothesis value for full rate to the hypothesis value for eighth rate is less than about 2.0 and the hypothesis value for half rate to hypothesis value for eighth rate is less than about 1.5 and the hypothesis value for quarter rate to hypothesis value for eighth rate is less than about 1.2;
  output a rate indication signal to indicate the quarter rate when a ratio of the hypothesis value for full rate to the hypothesis value for quarter rate is less than about 1.5and the hypothesis value for half rate to hypothesis value for quarter rate is less than about 1.2;
  output a rate indication signal to indicate the half rate when a ratio of the hypothesis value for full rate to the hypothesis value for half rate is less than about 1.2; and
  otherwise, output a rate indication signal to indicate the full rate.

27. A method of determining a rate of an encoded signal having a plurality of symbols, the encoded signal being transmitted at a selected one of a plurality of data rates, the method comprising:
 determining a first hypothesis value at an associated one of the data rates by summing a first plurality of absolute values, the first plurality of absolute values including an absolute value of each discrete symbol;
 determining a second hypothesis value at an associated one of the data rates by summing a second plurality of absolute values, each of the second plurality of absolute values being a sum of consecutive discrete symbols; and
 comparing a first set of selected hypothesis values to determine whether the transmission rate is equal to a first one of the plurality of data rates.

28. A method as recited in claim 21, wherein the comparison is accomplished by determining a plurality of ratios associated with the first set of selected hypothesis values and comparing each determined ratio to an associated predefined ratio.

29. A method as recited in claim 27, wherein when it is determined that the transmission rate is not equal to the first data rate, the method further includes comparing a second set of selected hypothesis values to determine whether the transmission rate is equal to a second one of the plurality of data rates.

30. A method as recited in claim 29, wherein the second data rate is higher than the first data rate.

31. A method as recited in claim 29, wherein the second set of selected hypothesis values is a subset of the first set of selected hypothesis values.

32. A method as recited in claim 29, wherein when it is determined that the transmission rate is not equal to the second data rate, the method further includes comparing a third set of selected hypothesis values to determine whether the transmission rate is equal to a third one of the plurality of data rates.

33. A method as recited in claim 32, wherein the third data rate is higher than the second data rate, which is higher than the first data rate.

34. A method as recited in claim 33, wherein the second set of selected hypothesis is a subset of the first set of selected hypothesis values.

35. A method as recited in claim 32, wherein when it is determined that the transmission rate is not equal to the third data rate, the method further includes defining a fourth one of the plurality of data rates as the transmission rate.

36. A method as recited in claim 27, wherein the plurality of symbols form a frame and the rate is determined for the frame.

37. A method as recited in claim 27, further comprising indicating the determined rate.

38. A method of determining a rate of an encoded signal having a plurality of symbols, the encoded signal being transmitted at a selected one of a plurality of data rates, the method comprising:

determining a plurality of hypothesis values that are each associated with one of the data rates; and comparing a first set of selected hypothesis values to determine whether the transmission rate is equal to a first one of the plurality of data rates, the comparison being accomplished by determining a plurality of ratios associated with the first set of selected hypothesis values and comparing each determined ratio to an associated predefined ratio, wherein the first data rate is defined as the determined rate when each determined ratio is less than about the associated predefined ratio.

39. A method as recited in claim 38, further comprising decoding the encoded signal based on the determined rate.

40. A method as recited in claim 39, further comprising error checking to verify the determined rate.

* * * * *